US010637522B2

(12) United States Patent
Oshima (10) Patent No.: US 10,637,522 B2
(45) Date of Patent: Apr. 28, 2020

(54) APPARATUS, CONTROL METHOD, AND NON-TRANSITORY COMPUTER READABLE MEDIUM STORING PROGRAM

(71) Applicant: NEC CORPORATION, Tokyo (JP)

(72) Inventor: Naoki Oshima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/394,588

(22) Filed: Apr. 25, 2019

(65) Prior Publication Data

US 2019/0363744 A1 Nov. 28, 2019

(30) Foreign Application Priority Data

Mar. 14, 2018 (JP) .................................. 2018-046922

(51) Int. Cl.
*H04B 1/12* (2006.01)
*H04B 1/10* (2006.01)
*H04B 7/08* (2006.01)
*H04B 7/06* (2006.01)

(52) U.S. Cl.
CPC .............. *H04B 1/12* (2013.01); *H04B 1/1027* (2013.01); *H04B 7/0617* (2013.01); *H04B 7/086* (2013.01); *H04B 7/0888* (2013.01)

(58) Field of Classification Search
CPC ......... H03L 7/06; H03L 7/0814; H03L 7/091; H04L 7/0008; H04L 7/0012; H04L 7/0087; H04L 7/0331; H04B 1/123; H04B 3/232; H04B 1/1027; H04B 7/0888; H04B 7/0617; H04B 15/00; H04B 1/1036; H04B 1/12; H04B 7/15585; H04B 7/086

See application file for complete search history.

(56) References Cited

U.S. PATENT DOCUMENTS

| 4,593,413 A | * | 6/1986 | Ozaki | ..................... H04B 7/084 455/139 |
| 2006/0072499 A1 | * | 4/2006 | Kent | ..................... H04B 7/0697 370/328 |
| 2009/0298453 A1 | * | 12/2009 | Elenes | ................. H04B 1/1081 455/205 |
| 2016/0380669 A1 | * | 12/2016 | Liu | ......................... H04B 1/525 375/219 |
| 2018/0375539 A1 | * | 12/2018 | Yotsumoto | ........... H04B 7/0848 |

FOREIGN PATENT DOCUMENTS

| JP | 2001-330660 A | 11/2001 |
| WO | 2016/167145 A1 | 10/2016 |

* cited by examiner

*Primary Examiner* — Khanh C Tran
(74) *Attorney, Agent, or Firm* — Sughrue Mion, PLLC (57) ABSTRACT

An apparatus includes a first receiving unit, a second receiving unit, a signal generation unit, and a control unit, in which the first receiving unit includes a first adjustment unit configured to generate a first signal by adjusting a phase and an amplitude of a received signal, the second receiving unit includes a second adjustment unit configured to generate a second signal by adjusting a phase and an amplitude of a received signal, the signal generation unit generates a third signal based on the first and second signals, and the control unit controls the first adjustment unit based on the third signal.

6 Claims, 5 Drawing Sheets

APPARATUS, CONTROL METHOD, AND NON-TRANSITORY COMPUTER READABLE MEDIUM STORING PROGRAM

INCORPORATION BY REFERENCE

This application is based upon and claims the benefit of priority from Japanese patent application No. 2018-046922, filed on Mar. 14, 2018, the disclosure of which is incorporated herein in its entirety by reference.

TECHNICAL FIELD

The present disclosure relates to an apparatus, a control method by an apparatus, and a non-transitory computer readable medium storing a program.

BACKGROUND ART

As radio communication has rapidly spread, lack of frequency bands used for radio communication is posing a problem. An example of the techniques for effectively using frequency bands is beamforming. The beamforming is a technique for enabling radio communication for a specific communication target by emitting directional radio waves, and is a technique that can prevent or reduce interference with other radio systems and the like while maintaining signal quality.

An example of the typical technique for performing the beamforming is a phased array. The phased array is a technique for strengthening a signal propagating in a desired direction by adjusting phases of radio signals supplied to a plurality of antenna elements in a transmitter and combining radio waves emitted from respective antenna elements in space. In order to adjust phases of radio signals supplied to the plurality of antenna elements in the transmitter, it is necessary to perform a calibration for variations in the phase caused by wiring of the substrate or the like, and hence to accurately monitor changes in the phase and changes in the amplitude occurring in the transmitter.

As related techniques, Japanese Unexamined Patent Application Publication No. 2001-330660 and International Patent Publication WO2016/167145 disclose techniques related to the phased array.

Incidentally, an example of the means for monitoring a phase change and an amplitude change occurring in a transmitter of a transceiver using the phased array technique is a technique using loop-back. The technique using the loop-back is a technique for monitoring a phase change or an amplitude change by inputting a part of an output signal of a transmitter to a receiver. In order to accurately monitor the phase change and the amplitude change occurring in the transmitter of the transmitter using the loop-back technique, it is necessary to accurately perform a calibration for a phase difference and an amplitude difference among antenna elements in the receiver of the transceiver using the loop-back technique.

Therefore, it is desired to develop a technique capable of accurately performing a calibration for a phase difference and an amplitude difference among antenna elements in a receiver of a transceiver using the loop-back technique.

SUMMARY

An object of the present disclosure is to provide a control method by an apparatus capable of solving the above-described problem and a non-transitory computer readable medium storing a program.

To achieve the above-described object, in an aspect according to the present disclosure, an apparatus includes a first receiving unit, a second receiving unit, a signal generation unit, and a control unit, in which the first receiving unit includes a first adjustment unit configured to generate a first signal by adjusting a phase and an amplitude of a received signal, the second receiving unit includes a second adjustment unit configured to generate a second signal by adjusting a phase and an amplitude of a received signal, the signal generation unit generates a third signal based on the first and second signals, and the control unit controls the first adjustment unit based on the third signal.

In another aspect according to the present disclosure, a control method performed by an apparatus including a first receiving unit, a second receiving unit, a signal generation unit, and a control unit, includes: generating a first signal by adjusting a phase and an amplitude of a signal received by the first receiving unit; generating a second signal by adjusting a phase and an amplitude of a signal received by the second receiving unit; generating a third signal based on the first and second signals; and controlling the phase and the amplitude of the signal received by the first receiving unit based on the third signal.

In another aspect according to the present disclosure, a program causes a computer of an apparatus including a first receiving unit, a second receiving unit, a signal generation unit, and a control unit to perform: generating a first signal by adjusting a phase and an amplitude of a signal received by the first receiving unit; generating a second signal by adjusting a phase and an amplitude of a signal received by the second receiving unit; generating a third signal based on the first and second signals; and controlling the phase and the amplitude of the signal received by the first receiving unit based on the third signal.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Example Embodiment

Example embodiments will be described hereinafter in detail with reference to the drawings.

Figure 1:
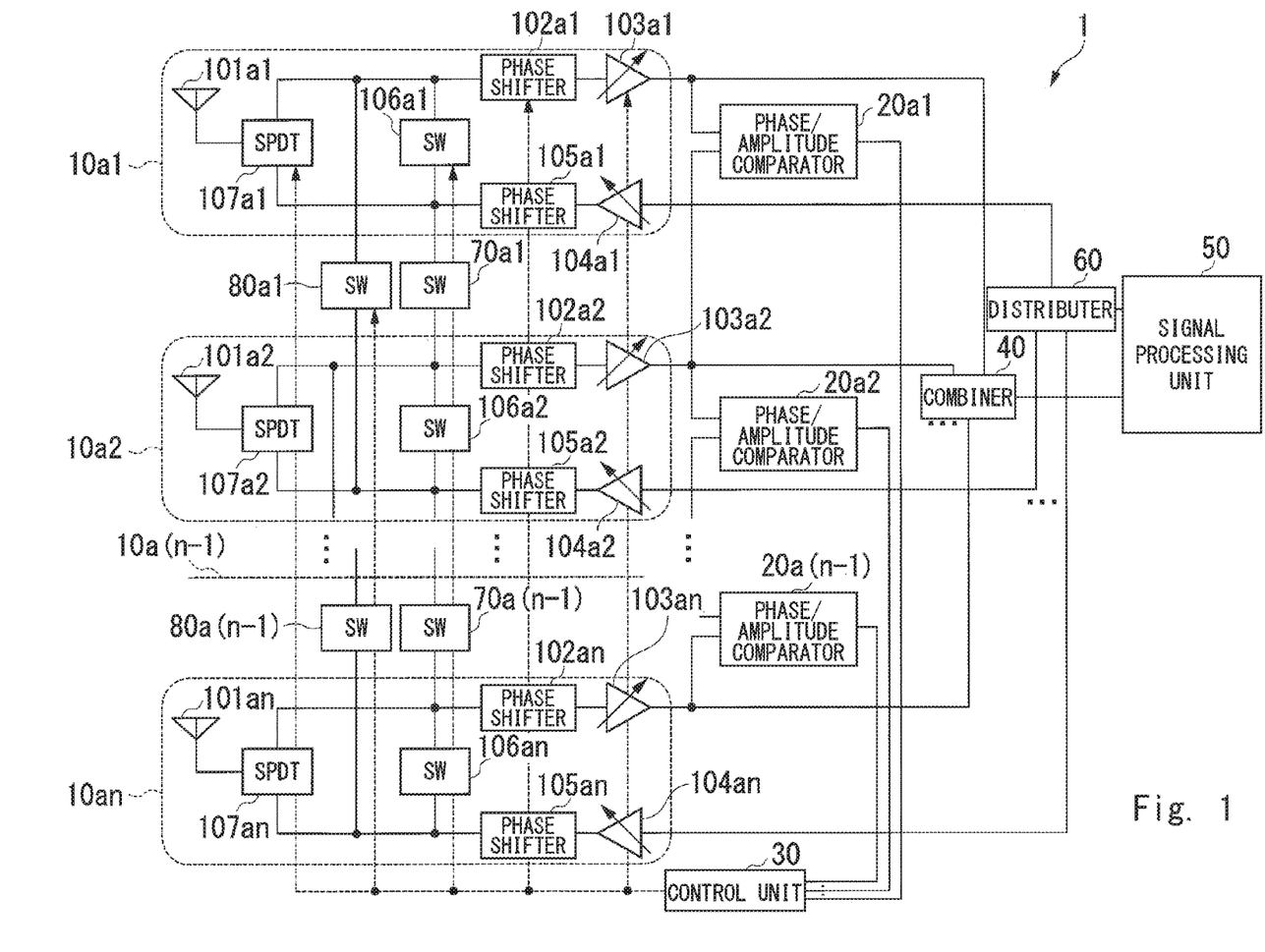
FIG. 1 shows a configuration of a transceiver according to an example embodiment of the present disclosure.

A transceiver 1 (an example of the apparatus) according to an example embodiment is a transceiver using a loop-back technique, and is a transceiver that monitors changes in phase (hereinafter referred to as phase changes) and changes in amplitude (hereinafter referred to as amplitude changes) by inputting a part of an output signal of its transmitter to its receiver (an example of the apparatus). The transceiver 1 according to an example embodiment has a function of accurately performing a calibration for a phase difference and an amplitude difference among antenna elements in the receiver. As shown in FIG. 1, the transceiver 1 includes transceiver units 10a1, 10a2, . . . , and 10an, phase/amplitude comparators 20a1, 20a2, . . . , and 20a(n−1) (an example of the signal generation unit), a control unit 30, a combiner 40, a signal processing unit 50, a distributor 60, and switches (indicated by "SW" in FIG. 1) 70a1, . . . , 70a(n−1), 80a1, . . . , and 80a(n−1). Note that "n" is an integer of two or greater.

The transceiver units 10a1, 10a2, . . . , and 10an are collectively referred to as the transceiver unit 10a. The phase/amplitude comparators 20a1, 20a2, . . . , and 20a(n−1) are collectively referred to as the phase/amplitude comparator 20a. The switches 70a1, . . . , and 70a(n−1) are collectively referred to as the switch 70a. The switches 80a1, . . . , and 80a(n−1) are collectively referred to as the switch 80a.

The transceiver unit 10a1 includes an antenna 101a1, phase shifters 102a1 and 105a1, variable gain amplifiers 103a1 and 104a1, a switch 106a1, and a single-pole double-throw switch (hereinafter referred to as an "SPDT") 107a1. The transceiver unit 10a1 transmits/receives a signal through the antenna 101a1 included in the transceiver unit 10a1. Note that the phase shifter 102a1 and the variable gain amplifier 103a1 form a phase shifter/amplifier (an example of the first adjustment unit or an example of the second adjustment unit).

The antenna 101a1 includes a first terminal. Each of the phase shifters 102a1 and 105a1 includes a first terminal, a second terminal, and a third terminal. Each of the variable gain amplifiers 103a1 and 104a1 includes a first terminal, a second terminal, and a third terminal. The switch 106a1 includes a first terminal, a second terminal, and a third terminal. The SPDT 107a1 includes a first terminal, a second terminal, a third terminal, and a fourth terminal.

The first terminal of the antenna 101a1 is connected to the first terminal of the SPDT 107a1. The first terminal of the phase shifter 102a1 is connected to the first terminal of the switch 106a1, the second terminal of the SPDT 107a1, and the switch 80a1. The second terminal of the phase shifter 102a1 is connected to the first terminal of the variable gain amplifier 103a1. The third terminal of the phase shifter 102a1 is connected to the control unit 30. The second terminal of the variable gain amplifier 103a1 is connected to the phase/amplitude comparator 20a1 and the combiner 40. The third terminal of the variable gain amplifier 103a1 is connected to the control unit 30. The first terminal of the variable gain amplifier 104a1 is connected to the distributor 60. The second terminal of the variable gain amplifier 104a1 is connected to the first terminal of the phase shifter 105a1. The third terminal of the variable gain amplifier 104a1 is connected to the control unit 30. The second terminal of the phase shifter 105a1 is connected to the second terminal of the switch 106a1 and the third terminal of the SPDT 107a1. The third terminal of the phase shifter 105a1 is connected to the control unit 30. The third terminal of the switch 106a1 is connected to the control unit 30. The fourth terminal of the SPDT 107a1 is connected to the control unit 30.

The antenna 101a1 receives a radio wave. The radio wave received by the antenna 101a1 is input as a signal to the phase shifter 102a1 through the SPDT 107a. The phase shifter 102a1 adjusts the phase of the signal received by the antenna 101a1 based on a control signal received from the control unit 30. The phase shifter 102a1 outputs the phase-adjusted signal to the variable gain amplifier 103a1.

The variable gain amplifier 103a1 amplifies the signal received from phase shifter 102a1 based on a control signal received from control unit 30.

The transceiver unit 10a2 includes an antenna 101a2, a phase shifter 102a2, a variable gain amplifier 103a2, a variable gain amplifier 104a2, a phase shifter 105a2, a switch 106a2, and an SPDT 107a2. The transceiver unit 10a2 transmits/receives a signal through the antenna 101a2 included in the transceiver unit 10a2. Note that the phase shifter 102a2 and the variable gain amplifier 103a2 form a phase shifter/amplifier.

The antenna 101a2 includes a first terminal. Each of the phase shifters 102a2 and 105a2 includes a first terminal, a second terminal, and a third terminal. Each of the variable gain amplifiers 103a2 and 104a2 includes a first terminal, a second terminal, and a third terminal. The switch 106a2 includes a first terminal, a second terminal, and a third terminal. The SPDT 107a2 includes a first terminal, a second terminal, a third terminal, and a fourth terminal.

Similarly, the transceiver unit 10an includes an antenna 101an, a phase shifter 102an, a variable gain amplifier 103an, a variable gain amplifier 104an, a phase shifter 105an, a switch 106an, and an SPDT 107an. The transceiver unit 10an transmits/receives a signal through the antenna 101an included in the transceiver unit 10an. Note that the phase shifter 102an and the variable gain amplifier 103an form a phase shifter/amplifier.

The antenna 101an includes a first terminal. Each of the phase shifters 102an and 105an includes a first terminal, a second terminal, and a third terminal. Each of the variable gain amplifiers 103an and 104an includes a first terminal, a second terminal, and a third terminal. The switch 106an includes a first terminal, a second terminal, and a third terminal. The SPDT 107an includes a first terminal, a second terminal, a third terminal, and a fourth terminal.

The antennas 101a1, 101a2, . . . , and 101an are collectively referred to as the antenna 101a. The phase shifters 102a1, 102a2, . . . , and 102an are collectively referred to as the phase shifter 102a. The variable gain amplifiers 103a1, 103a2, . . . , and 103an are collectively referred to as the variable gain amplifier 103a. The variable gain amplifiers 104a1, 104a2, . . . , and 104an are collectively referred to as the variable gain amplifier 104a. The phase shifters 105a1, 105a2, . . . , and 105an are collectively referred to as the phase shifter 105a. The switches 106a1, 106a2, . . . , and 106an are collectively referred to as the switch 106a. The SPDTs 107a1, 107a2, . . . , and 107an are collectively referred to as the SPDT 107a.

The connection among the antenna 101a, the phase shifter 102a, the variable gain amplifier 103a, the variable gain amplifier 104a, the phase shifter 105a, the switch 106a, and the SPDT 107a in each of the transceiver units 10a is similar to the above-described connection among the antenna 101a1, the phase shifters 102a1 and 105a1, the variable gain amplifiers 103a1 and 104a1, the switch 106a1, and the SPDT 107a1 in the transceiver unit 10a1. However, the phase shifter 102an in the transceiver unit 10an is not connected to the switch 80a. Further, the phase shifters 105a2 to 105an are connected to the switches 80a1 to 80a(n−1), respectively.

Note that an antenna, a phase shifter, and a variable gain amplifier included in each of received-signal processing units 90a perform processes similar to those performed by the antenna 101a1, the phase shifter 102a1, and the variable gain amplifier 103a1. Further, the antennas 101a1,

101*a*2, . . . , and 101*an* form an array antenna as a whole, and transmit/receive directional signals based on the control of the control unit 30.

Each of the phase/amplitude comparators 20*a* includes a first terminal, a second terminal, and a third terminal.

The first terminal of the phase/amplitude comparator 20*a*1 is connected to the second terminal of the variable gain amplifier 103*a*1. The second terminal of the phase/amplitude comparator 20*a*1 is connected to the second terminal of the variable gain amplifier 103*a*2. The third terminal of the phase/amplitude comparator 20*a*1 is connected to the control unit 30.

The first terminal of the phase/amplitude comparator 20*a*2 is connected to the second terminal of the variable gain amplifier 103*a*2. The second terminal of the phase/amplitude comparator 20*a*2 is connected to the second terminal of the variable gain amplifier 103*a*3. The third terminal of the phase/amplitude comparator 20*a*2 is connected to the control unit 30.

The first terminal of the phase/amplitude comparator 20*a*($n$−1) is connected to the second terminal of the variable gain amplifier 103*a*($n$−1). The second terminal of the phase/amplitude comparator 20*a*($n$−1) is connected to the second terminal of the variable gain amplifier 103*an*. The third terminal of the phase/amplitude comparator 20*a*($n$−1) is connected to the control unit 30.

The control unit 30 includes first to nth terminals. The first terminal of the control unit 30 is connected to the third terminal of the phase/amplitude comparator 20*a*1. The second terminal of the control unit 30 is connected to the third terminal of the phase/amplitude comparator 20*a*2. The ($n$−1)th terminal of the control unit 30 is connected to the third terminal of the phase/amplitude comparator 20*a*($n$−1). The nth terminal of the control unit 30 is connected to the third terminal of each of the phase shifters 102*a*, the third terminal of each of the variable gain amplifiers 103*a*, the third terminal of each of the variable gain amplifiers 104*a*, the third terminal of each of the phase shifters 105*a*, the third terminal of each of the switches 106*a*, the fourth terminal of each of the SPDTs 107*a*, the switches 70*a*1 to 70*a*($n$−1), and the switches 80*a*1 to 80*a*($n$−1).

The control unit 30 outputs a control signal from its nth terminal to each of the phase shifter 102*a*, the variable gain amplifier 103*a*, the variable gain amplifier 104*a*, the phase shifter 105*a*, the switch 106*a*, and the SPDT 107*a*.

The combiner 40 includes a first terminal, a second terminal, . . . , an nth terminal, and an (n+1)th terminal. The first terminal of the combiner 40 is connected to the second terminal of the variable gain amplifier 103*a*1. The second terminal of the combiner 40 is connected to the second terminal of the variable gain amplifier 103*a*2. The nth terminal of the combiner 40 is connected to the second terminal of the variable gain amplifier 103*an*. The (n+1)th terminal of the combiner 40 is connected to the signal processing unit 50.

When the transceiver 1 receives a signal, the combining unit 40 combines signals received by the transceiver units 10*a*. The combining unit 40 outputs the combined signal to the signal processing unit 50.

The signal processing unit 50 includes a first terminal and a second terminal. The first terminal of the signal processing unit 50 is connected to the (n+1)th terminal of the combiner 40. The second terminal of the signal processing unit 50 is connected to the distributor 60.

The signal processing unit 50 performs signal processing. The signal processing unit 50 may include, for example, a down-converter, a Nyquist filter, an analog-to-digital (A/D) converter, an up-converter, a digital-to-analog (D/A) converter, etc. When the transceiver 1 receives a signal, the signal processing unit 50 performs, for example, signal processing for demodulating the received signal, such as down-converting the signal combined by the combining unit 40, filtering the down-converted signal, and converting the filtered signal into a digital signal. Further, when the transceiver 1 transmits a signal, the signal processing unit 50 performs, for example, signal processing for modulating the signal to be transmitted, such as converting a digital signal indicating a content to be transmitted into an analog signal, filtering the analog signal, and up-converting the filtered signal.

The distributor 60 includes a first terminal, a second terminal, . . . , an nth terminal, and an (n+1)th terminal. The first terminal of the distributor 60 is connected to the first terminal of the variable gain amplifier 104*a*1. The second terminal of the distributor 60 is connected to the first terminal of the variable gain amplifier 104*a*2. The nth terminal of the distributor 60 is connected to the first terminal of the variable gain amplifier 104*an*. The (n+1)th terminal of the distributor 60 is connected to the second terminal of the signal processing unit 50. The distributor 60 outputs the signal, for which the signal processing for modulation has been performed by the signal processing unit 50, to each of the transceiver units 10*a*.

The switch 70*a*1 includes a first terminal, a second terminal, and a third terminal. The first terminal of the switch 70*a*1 is connected to the second terminal of the phase shifter 105*a*1, the second terminal of the switch 106*a*1, and the third terminal of the SPDT 107*a*1. The second terminal of the switch 70*a*1 is connected to the first terminal of the phase shifter 102*a*2, the first terminal of the switch 106*a*2, the second terminal of the SPDT 107*a*2, and the switch 80*a*2. The third terminal of the switch 70*a*1 is connected to the nth terminal of the control unit 30.

The switch 70*a*($n$−1) includes a first terminal, a second terminal, and a third terminal. The first terminal of the switch 70*a*($n$−1) is connected to the second terminal of the phase shifter 105*a*($n$−1), the second terminal of the switch 106*a*($n$−1), and the third terminal of the SPDT 107*a*($n$−1). The second terminal of the switch 70*a*($n$−1) is connected to the first terminal of the phase shifter 102*an*, the first terminal of the switch 106*an*, and the second terminal of the SPDT 107*an*. The third terminal of the switch 70*a*($n$−1) is connected to the nth terminal of the control unit 30. The switch 70*a* becomes an on-state (a closed state) or an off-state (an opened state) based on the control of the control unit 30.

The switch 80*a*1 includes a first terminal, a second terminal, and a third terminal. The first terminal of the switch 80*a*1 is connected to the first terminal of the phase shifter 102*a*1, the first terminal of the switch 106*a*1, and the second terminal of the SPDT 107*a*1. The second terminal of the switch 80*a*1 is connected to the second terminal of the phase shifter 105*a*2, the second terminal of the switch 106*a*2, the third terminal of the SPDT 107*a*2, and the second terminal of the switch 70*a*2.

The switch 80*a*2 includes a first terminal, a second terminal, and a third terminal. The first terminal of the switch 80*a*2 is connected to the first terminal of the phase shifter 102*a*2, the first terminal of the switch 106*a*2, the second terminal of the SPDT 107*a*2, and the second terminal of the switch 70*a*1. The second terminal of the switch 80*a*2 is connected to the second terminal of the phase shifter 105*a*3, the second terminal of the switch 106*a*3, the third terminal of the SPDT 107*a*3, and the switch 70*a*3.

The switch $80a(n-1)$ includes a first terminal, a second terminal, and a third terminal. The first terminal of the switch $80a(n-1)$ is connected to the first terminal of the phase shifter $102a(n-1)$, the first terminal of the switch $106a(n-1)$, the second terminal of the SPDT $107a(n-1)$, and the second terminal of the switch $70a(n-2)$. The second terminal of the switch $80a(n-1)$ is connected to the second terminal of the phase shifter $105an$, the second terminal of the switch $106an$, and the third terminal of the SPDT $107an$. The switch $80a$ becomes an on-state (a closed state) or an off-state (an opened state) based on the control of the control unit 30.

In the transceiver unit $10a1$, the SPDT $107a1$ switches its operation between transmission and reception. Further, when the switch $106a1$ is in an on-state, it outputs a part of an output signal of the phase shifter $105a1$ to the phase shifter $102a1$. The above-described operations of the SPDT $107a1$ and the switch $106a1$ are controlled by the control unit 30. Further, the switch $70a1$ outputs a part of the output signal of the phase shifter $105a1$ to the phase shifter $102a2$. In this way, the antenna array apparatus 1 enables calibrations for a phase and an amplitude between adjacent transceiver units (i.e., between the transceiver units $10a1$ and $10a2$, between the transceiver units $10a2$ and $10a3$, ..., and between the transceivers $10a(n-1)$ and $10an$). However, the switch $80a1$ has to be in an off-state so that a signal received by the antenna $101a1$ is not output to the phase shifter $102a2$ through the switches $80a1$ and $106a2$.

When a signal is to be transmitted from the phase shifter $105a1$ to the phase/amplitude comparator $20a1$ through the switch $106a1$, the phase shifter $102a1$, and the variable gain amplifier $103a1$, the control unit 30 controls the switches $106a1$ and $106a2$ into an on-state and controls the switches $70a1$ and $80a1$ into an off-state. Further, when a signal is to be transmitted from the phase shifter $105a1$ to the phase/amplitude comparator $20a1$ through the switch $70a1$, the phase shifter $102a2$, and the variable gain amplifier $103a2$, the control unit 30 controls the switches $106a1$ and $106a2$ into an off-state and controls the switches $70a1$ and $80a1$ into an on-state.

A calibration for a phase and an amplitude in the transceiver 1 is described hereinafter. In FIG. 1, a phase/amplitude error of a transmission path in the transceiver unit $10a1$ is represented by $\Delta TX1$ and a phase shift/amplitude error of a reception path therein is represented by $\Delta RX1$. A phase/amplitude error of a transmission path in the transceiver unit $10a2$ is represented by $\Delta TX2$ and a phase/amplitude error of a reception path therein is represented by $\Delta RX2$. Similarly, a phase/amplitude error of a transmission path in the transceiver unit $10an$ is represented by $\Delta TXn$ and a phase/amplitude error of a reception path therein is represented by $\Delta RXn$. It is assumed that the same setting is made for each of the phase shifters $102a$, the phase shifters $105a$, the variable gain amplifiers $103a$, and the variable gain amplifiers $104a$ for detecting phase/amplitude errors.

Note that when the switches $106a1$ and $106a2$ are turned on and the switches $70a1$ and $80a1$ are turned off by the control of the control unit 30, a signal propagates from the phase shifter $105a1$ to the phase/amplitude comparator $20a1$ through the switch $106a1$, the phase shifter $102a1$, and the variable gain amplifier $103a1$. Further, a signal propagates from the phase shifter $105a2$ to the phase/amplitude comparator $20a1$ through the switch $106a2$, the phase shifter $102a2$, and the variable gain amplifier $103a2$. Further, an error Err1 contained in the signal propagating from the phase shifter $105a1$ to the phase/amplitude comparator $20a1$ through the switch $106a1$, the phase shifter $102a1$, and the variable gain amplifier $103a1$, and an error Err2 contained in the signal propagating from the phase shifter $105a2$ to the phase/amplitude comparator $20a1$ through the switch $106a2$, the phase shifter $102a2$, and the variable gain amplifier $103a2$ are expressed by the below-shown Expressions (1) and (2), respectively.

$$\text{Err1} = \Delta TX1 + \Delta RX1 \tag{1}$$

$$\text{Err2} = \Delta TX2 + \Delta RX2 \tag{2}$$

Similarly, when the switches $106a1$ and $106a2$ are turned off and the switches $70a1$ and $80a1$ are turned on by the control of the control unit 30, a signal propagates from the phase shifter $105a1$ to the phase/amplitude comparator $20a1$ through the switch $70a1$, the phase shifter $102a2$, and the variable gain amplifier $103a2$. Further, a signal propagates from the phase shifter $105a2$ to the phase/amplitude comparator $20a1$ through the switch $80a1$, the phase shifter $102a1$, and the variable gain amplifier $103a1$. Further, an error Err3 contained in the signal propagating from the phase shifter $105a1$ to the phase/amplitude comparator $20a1$ through the switch $70a1$, the phase shifter $102a2$, and the variable gain amplifier $103a2$, and an error Err4 contained in the signal propagating from the phase shifter $105a2$ to the phase/amplitude comparator $20a1$ through the switch $80a1$, the phase shifter $20a1$, and the variable gain amplifier $103a1$ are expressed by the below-shown Expressions (3) and (4), respectively.

$$\text{Err3} = \Delta TX1 + \Delta RX2 \tag{3}$$

$$\text{Err4} = \Delta TX2 + \Delta RX1 \tag{4}$$

Note that each of $\Delta TX$ and $\Delta RX$ can be adjusted by changing an amount of the phase (hereinafter referred to as a phase amount) of the phase shifter and the gain of the variable gain amplifier by the control unit 30.

For example, by adjusting the value of $\Delta TX2$ so that the Expressions (1) and (2) become equal to each other, i.e., so that a phase difference and an amplitude difference output from the phase/amplitude comparator $20a1$ become zero, the below-shown Expression (5) is obtained.

$$\Delta TX1 + \Delta RX1 = \Delta TX2 + \Delta RX2 \tag{5}$$

Similarly, by adjusting the value of $\Delta RX2$ so that the Expressions (3) and (4) become equal to each other, i.e., so that a phase difference and an amplitude difference output from the phase/amplitude comparator $20a1$ become zero, the below-shown Expression (6) is obtained.

$$\Delta TX1 + \Delta RX2 = \Delta TX2 + \Delta RX1 \tag{6}$$

By regarding the Expressions (5) and (6) as simultaneous equations and solving them, the below-shown Expressions (7) and (8) are obtained.

$$\Delta TX1 = \Delta TX2 \tag{7}$$

$$\Delta RX1 = \Delta RX2 \tag{8}$$

In this way, it is possible to perform a calibration for errors in the phase and the amplitude in the transceiver 1. Note that in the transceiver 1 according to the example embodiment of the present disclosure, each of the transceiver units $10a$ includes the SPDT $107a$ and uses one common antenna $101a$ for both the transmission path and the reception path. However, in a transceiver unit $10a$ according to other example embodiments of the present disclosure, a dedicated antenna $101a$ may be provided for each of the transmission path and the reception path.

Further, when there are at least three transceiver units 10a, there is a case in which the number of switches connected to one phase shifter in one transceiver unit 10a differs from that in another transceiver unit 10a, thus causing an impedance mismatch between these transceiver units 10a. In such a case, a dummy switch may be added to resolve the impedance mismatch.

Figure 2:
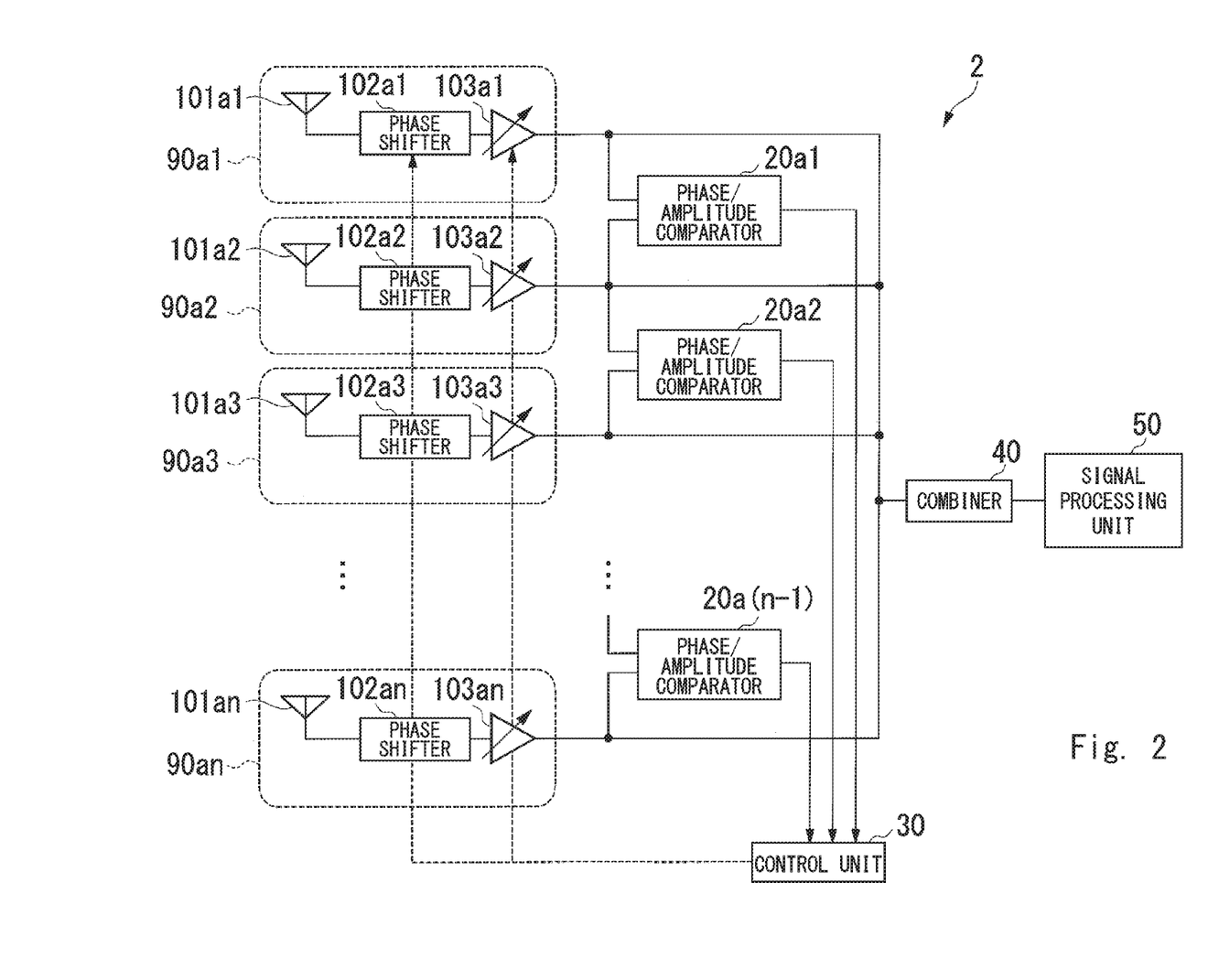
FIG. 2 shows a configuration of a receiver according to an example embodiment of the present disclosure.

Next, in order to explain a calibration for a phase difference and an amplitude difference among antenna elements in the receiver of the transceiver 1 using the loop-back technique, a phased array receiver shown in FIG. 2, which is equivalent to the configuration of the receiver 2 of the transceiver 1 shown in FIG. 1, is described.

As shown in FIG. 2, the phased array receiver 2 includes a first received-signal processing unit 90a1, a second received-signal processing unit 90a2, a third received-signal processing unit 90a3, . . . , and an nth received-signal processing unit 90an, a phase/amplitude comparator 20a1, a phase/amplitude comparator 20a2, . . . , and a phase/amplitude comparator 20a(n−1), a control unit 30, a combiner 40, and a signal processing unit 50. The first, second, third, . . . , and nth received-signal processing units 90a1, 90a2, 90a3, . . . , and 90an are collectively referred to as the received-signal processing unit 90a. Note that "n" is an integer of two or greater.

The output terminal of the first received-signal processing unit 90a1 is connected to the first input terminal of the phase/amplitude comparator 20a1 and the input terminal of the combiner 40. The output terminal of the second received-signal processing unit 90a2 is connected to the second input terminal of the phase/amplitude comparator 20a1, the first input terminal of the phase/amplitude comparator 20a2, and the input terminal of the combiner 40. The output terminal of the third received-signal processing unit 90a3 is connected to the second input terminal of the phase/amplitude comparator 20a2, the first input terminal of the phase/amplitude comparator 20a3 (not shown), and the input terminal of the combiner 40. The output terminal of the nth received-signal processing unit 90an is connected to the second input terminal of the phase/amplitude comparator 20a(n−1) and the input terminal of the combiner 40. The output terminal of the phase/amplitude comparator 20a1 is connected to the first input terminal of the control unit 30. The output terminal of the phase/amplitude comparator 20a2 is connected to the second input terminal of the control unit 30. The output terminal of the phase/amplitude comparator 20a(n−1) is connected to the (n−1)th input terminal of the control unit 30. The output terminal of the control unit 30 is connected to the input terminal of each of the received-signal processing units 90a. The output terminal of the combiner 40 is connected to the input terminal of the signal processing unit 50.

Each of the received-signal processing units 90a is a processing unit that changes a phase of a received signal and adjusts its signal level (i.e., its amplitude). Similarly to the first received-signal processing unit 90a1, each of the received-signal processing units 90a includes an antenna, a phase shifter, and a variable gain amplifier.

Specifically, as shown in FIG. 2, the first received-signal processing unit 90a1 includes an antenna 101a1, a phase shifter 102a1, and a variable gain amplifier 103a1. Further, the second received-signal processing unit 90a2 includes an antenna 101a2, a phase shifter 102a2, and a variable gain amplifier 103a2. The third received-signal processing unit 90a3 includes an antenna 101a3, a phase shifter 102a3, and a variable gain amplifier 103a3. The nth received-signal processing unit 90an includes an antenna 101an, a phase shifter 102an, and a variable gain amplifier 103an.

Each of the phase/amplitude comparators 20a receives two signals and determines a phase difference and an amplitude difference between the two received signals by comparing these two signals with each other. Each of the phase/amplitude comparators 20a outputs the determined phase difference and the amplitude difference to the control unit 30.

Specifically, the phase/amplitude comparator 20a1 receives a signal output from the first reception signal processor 90a1 and a signal output from the second reception signal processor 90a2. The phase/amplitude comparator 20a1 determines a phase difference and an amplitude difference between the two received signals by comparing these two signals with each other. Further, the phase/amplitude comparator 20a2 receives a signal output from the second received-signal processing unit 90a and a signal output from the third received-signal processing unit 90a3, and similarly to the phase/amplitude comparator 20a1, determines a phase difference and an amplitude difference between these two signals. Further, the phase/amplitude comparator 20a(n−1) receives a signal output from the (n−1)th received-signal processing unit 90a (not shown) and a signal output from the nth received-signal processing unit 90an, and similarly to the phase/amplitude comparator 20a1, determines a phase difference and an amplitude difference between these two signals. Then, each of the phase/amplitude comparators 20a outputs the determined phase difference and the amplitude difference to the control unit 30.

The control unit 30 receives information about the phase difference and the amplitude difference from each of the phase/amplitude comparators 20a. The control unit 30 determines an amount of an adjustment (hereinafter referred to as an adjustment amount) for the phase (i.e., determines weighting for the phase) for each of the phase shifters 102a based on the phase difference indicated by the information so that a signal having a desired directivity is generated in the combiner 40. The control unit 30 generates a control signal indicating the determined adjustment amount for the phase and outputs the generated control signal to each of the phase shifters 102a. Further, the control unit 30 determines an adjustment amount for the amplitude (i.e., determines weighting for the amplitude) for each of the variable gain amplifiers 103a based on the amplitude difference indicated by the information so that a signal having a desired amplitude is generated in the combiner 40. The control unit 30 generates a control signal indicating the determined adjustment amount for the amplitude and outputs the generated control signal to each of the variable gain amplifiers 103a.

Specifically, for example, after a predetermined initial weighting value is set, each of the phase/amplitude comparators 20a compares two input signals. Each of the phase/amplitude comparators 20a sends a result of the comparison to the control unit 30. The control unit 30, which is controlling the phase and the gain of the phase shifter 102a and the variable gain amplifier 103a, calculates a weighting value for obtaining a desired directivity based on the comparison result sent from the phase/amplitude comparator 20a. When there is no variation among the received-signal processing units 90a, it is possible to calculate an array factor from the distance between the antennas 101a and the frequency of the radio signal, and hence calculate an appropriate weighting value. The array factor is a directivity that is determined by the arrangement of the antennas. Note that when there is no variation in the arrays owing to the ideal equal-length wiring and the like, the initial weighting value is zero (gain: 0 dB, phase: 0 degree).

The combiner 40 combines signals weighted by the phase shifter 102a and the variable gain amplifier 103a. The signal combined by the combiner 40 has a directivity according to the weighting.

The combiner 40 outputs the combined signal to the signal processing unit 50. The signal processing unit 50 includes a down-converter, a Nyquist filter, an analog-to-digital converter, etc., and performs signal processing such as demodulation.

Note that in order to detect a phase/amplitude error between the received-signal processing units 90a, it is necessary to compare signals of the received-signal processing units 90a with each other by the respective phase/amplitude comparator 20a. To do so, it is necessary that a signal received by each received-signal processing unit 90a should be known. Therefore, when a calibration for a phase/amplitude error is performed, the received-signal processing unit 90a is made to externally receive a known signal. Note that it is desirable that each received-signal processing unit 90a is made to receive a signal having the same phase. When the control values for the amplitudes of the variable gain amplifiers 103a and 104a and the phase shift amounts of the phase shifters 102a and 105a are equal to each other, the output signal of the phase/amplitude comparator 20a corresponds to the variation between the adjacent received-signal processing units 90a. It is possible to perform a calibration for the phase/amplitude error between the received-signal processing units 90a by acquiring the variations for all the control values for the phase shifters 102a and 105a and the variable gain amplifiers 103a and 104a.

As described above, the transceiver 1 is a transceiver that includes a plurality of receiving units and a control unit, and uses a loop-back technique. Each of the plurality of receiving units includes a reception phase shifter 102a that adjusts a phase of a received signal and a reception amplifier 103a that amplifies the received signal. The reception phase shifter 102a and the reception amplifier 103a are connected in series with each other. Further, the transceiver 1 include a plurality of phase/amplitude comparators 20a each of which receives output signals of the receiving amplifiers 103a included in two adjacent receiving units among the plurality of receiving units, and compares phases of the received output signals with each other and amplitudes of the received output signals with each other. The control unit 30 controls the phase adjustment performed by the reception phase shifter 102a and the amplification performed by the reception amplifier 103a based on results of the comparisons performed by the plurality of phase/amplitude comparators 20a.

By configuring the transceiver 1 as described above, it is possible to adjust phases and amplitudes of signals in the plurality of receiving units under the control of the control unit 30. As a result, in the transceiver 1, it is possible to perform a calibration for a phase difference and an amplitude difference among antenna elements.

(Modified Example)

Figure 3:
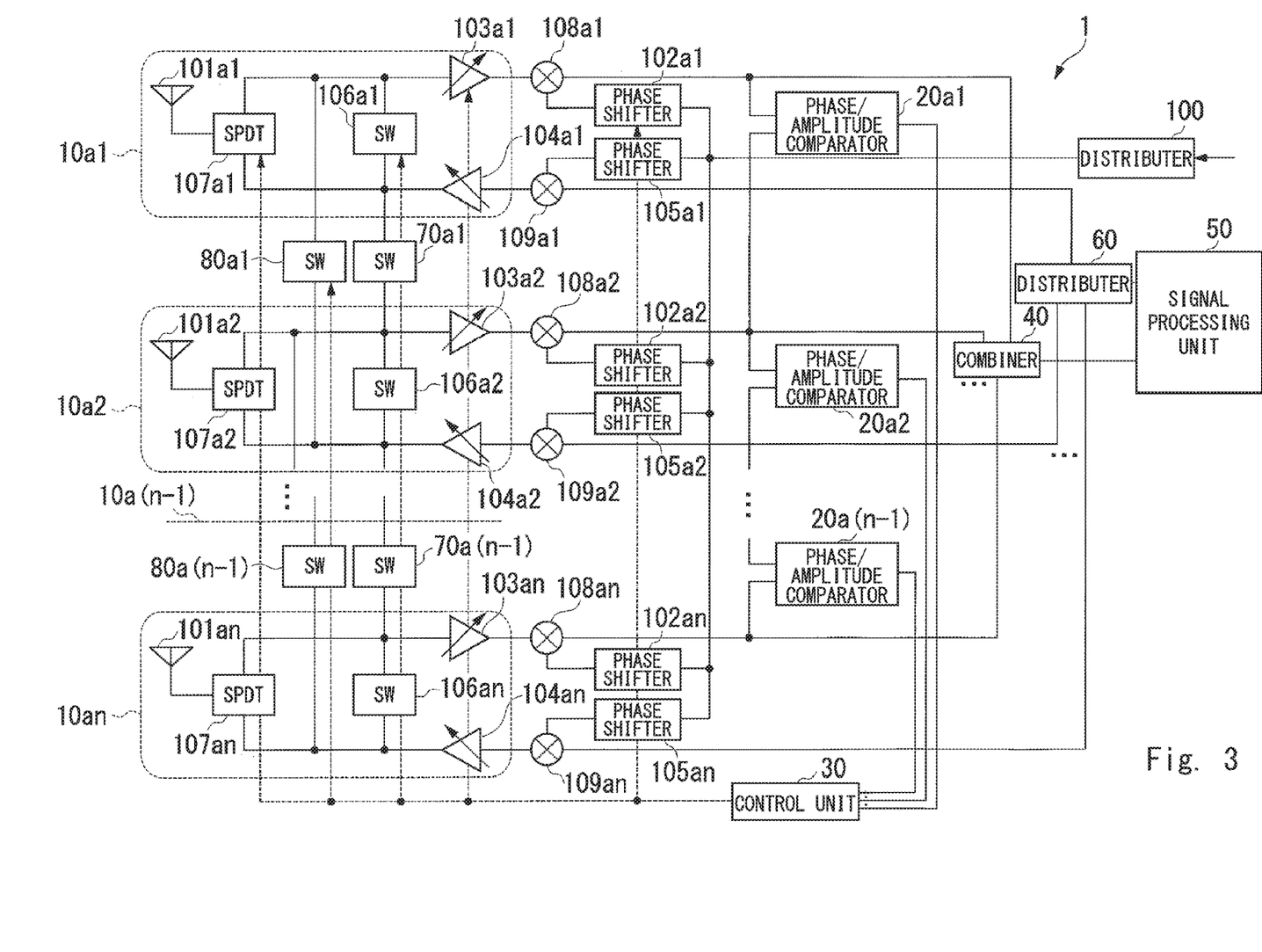
FIG. 3 shows a modified example of the example embodiment of the present disclosure.

FIG. 3 is a modified example of the transceiver 1 shown in FIG. 1. A phase shifter shown in FIG. 3 is one called an RF (Radio Frequency) phase shifter that rotates a phase in an RF frequency band. Regarding the transceiver 1 including the phased array antenna 101a, there may be a phase shifter called an IF (Intermediate Frequency) phase shifter or an LO (Local Oscillator) phase shifter. The transceiver 1 shown in FIG. 3 shows an example of a configuration of a transceiver including an LO phase shifter. The transceiver 1 shown in FIG. 3 includes mixers 108a1, 108a2, . . . , 108an, 109a1, 109a2, . . . , and 109an. Note that the mixers 108a1, 108a2, . . . , and 108an are collectively referred to as the mixer 108a. Further, the mixers 109a1, 109a2, . . . , and 109an are collectively referred to as the mixer 109a. The transceiver 1 further includes a distributor 100. The distributor 100 distributes an LO signal received from an LO signal source (also referred to as a local oscillator) (not shown) to each of the phase shifters 102a and 105a. Regarding the calibration for phase/amplitude errors between transmission/reception paths, it is possible to adjust the phases/amplitudes by changing the phase amounts of the phase shifters and the gains of the variable gain amplifiers as described above. However, the mixer 108a is used as a down-converter. Further, the mixer 109a is used as an up-converter. Therefore, the direction of the phase rotation to be adjusted is reversed. That is, assuming that the phase shifters 102a and 105a rotate the phases by the same phase amount $\Delta\Phi$, the phase of the output signal of the mixer 108a rotates by $-\Delta\Phi$ and the phase of the output signal of the mixer 109a rotates by $+\Delta\Phi$. Note that the variable gain amplifiers 103a and 104a, which adjust the amplitudes, are disposed at places where RF signals are amplified. The variable gain amplifiers 103a and 104a may be those that amplify IF signals. Further, the variable gain amplifiers 103a and 104a may be disposed at places where signals that have already been mixed with the LO signal by the mixers 108a and 109a are amplified. Further, in the modified example, the output signal of the mixer 108a and the input signal of the mixer 109a are IF signals. However, these signals may be baseband signals by a direct conversion technique.

Figure 4:
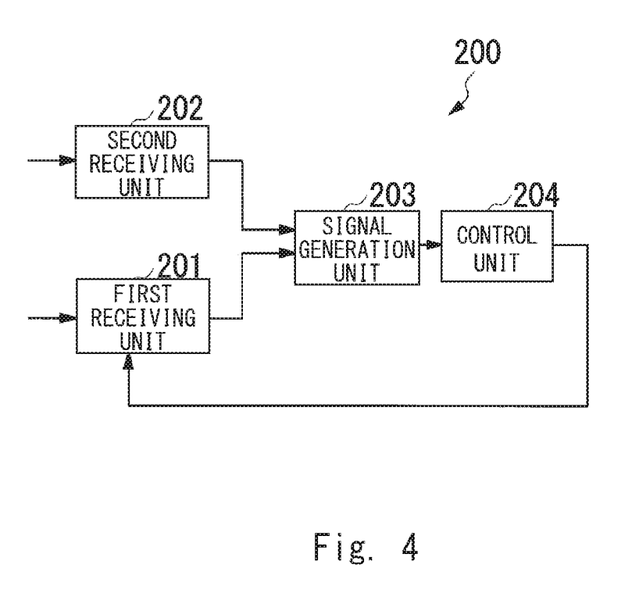
FIG. 4 shows a minimum configuration of a receiver according to an example embodiment of the present disclosure.

FIG. 4 shows a minimum configuration of a receiver according to an example embodiment.

An apparatus 200 includes a first receiving unit 201, a second receiving unit 202, a signal generation unit 203, and a control unit 204. The first receiving unit 201 includes a first adjustment unit configured to generate a first signal by adjusting a phase and an amplitude of a received signal. The second receiving unit 202 includes a second adjustment unit configured to generate a second signal by adjusting a phase and an amplitude of a received signal. The signal generation unit 203 generates a third signal based on the first and second signals. The control unit 204 controls the first adjustment unit based on the third signal.

Note that in the example embodiment, the order of processes may be changed as long as appropriate processes are performed.

Specifically, for example, the transceiver 1 shown in FIG. 1 has been described on the assumption that the phase shifter/amplifier formed by the phase shifter 102a and the variable gain amplifier 103a performs the amplification after the phase shift. Further, the transceiver 1 shown in FIG. 1 has been described on the assumption that the phase shifter/amplifier formed by the phase shifter 105a and the variable gain amplifier 104a performs the phase shift after the amplification. However, in other example embodiments, regarding the order of processes for the phase shift and the amplification in the phase shifter/amplifier, the amplification may be performed after the phase shift or the phase shift may be performed after the amplification.

Each of the storage unit and other storage devices in the example embodiment may be disposed at any place as long as appropriate transmission and reception of information are performed. Further, each of the storage unit and other storage devices may be formed of a plurality of units or devices and data may be stored in a distributed manner as long as appropriate transmission and reception of information are performed.

According to an embodiment, it is possible to accurately perform a calibration for a phase difference and an amplitude difference among antenna elements in a transceiver using a loop-back technique.

Example embodiments have been described above. The above-described signal processing unit 50 and other control devices may include a computer system inside thereof. Further, the above-described processes are stored in a computer readable recording medium in the form of a program and these processes are performed by having a computer load and execute this program. An example of the computer is shown below.

Figure 5:
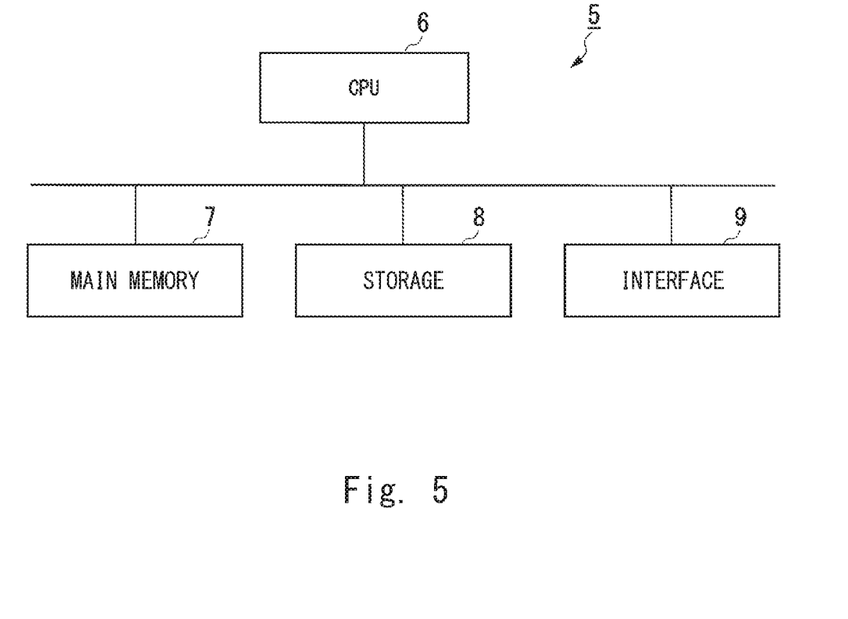
FIG. 5 is a schematic block diagram showing a configuration of a computer according to at least one example embodiment.

FIG. 5 is a schematic block diagram showing a configuration of a computer according to at least one example embodiment.

As shown in FIG. 5, the computer 5 includes a CPU 6, a main memory 7, a storage 8, and an interface 9.

For example, each of the above-described signal processing unit 50 and other control devices is implemented in the computer 5. Further, an operation of each of the above-described processing units is stored in the storage 8 in the form of a program. The CPU 6 loads a program from the storage 8, unfolds the loaded program in the main memory 7, and performs the above-described process according to this program. Further, the CPU 6 secures a storage area corresponding to each of the above-described storage unit in the main memory 7 according to the program.

Examples of the storage 8 include an HDD (Hard Disk Drive), an SSD (Solid State Drive), a magnetic disc, a magneto-optical disc, a CD-ROM (Compact Disc Read Only Memory), and a DVD-ROM (Digital Versatile Disc Read Only Memory), and a semiconductor memory. The storage 8 may be an internal medium directly connected to a bus of the computer 5 or may be an external medium connected to the computer 5 through the interface 9 or a communication line. Further, in the case where the program is distributed to the computer 5 through a communication line, the computer 5, which has received the distributed program, may unfold the program in the main memory 7 and perform the above-described process. In at least one example embodiment, the storage 8 is a non-transitory tangible storage medium.

Further, the program may provide some of the above-described functions. Further, the program may be a file that can provide the above-described functions in combination with a program(s) already recorded in the computer system, i.e., may be the so-called differential file (the so-called differential program).

Although some example embodiments according to the present disclosure have been described, these example embodiments are examples and do not limit the scope of the invention. Various additions, omissions, replacements, and changes may be made to these example embodiments without departing from the scope of the invention.

What is claimed is:

1. An apparatus comprising:
a plurality of receiving units including at least first and second receiving units,
the first receiving unit comprising a first adjustment unit configured to generate a first signal by adjusting a phase and an amplitude of a received signal,
the second receiving unit comprising a second adjustment unit configured to generate a second signal by adjusting a phase and an amplitude of a received signal;
at least one transmitting unit comprising a third adjustment unit configured to generate a fourth signal by adjusting a phase and an amplitude of a received signal;
a switch disposed between the transmitting unit and the receiving unit, the receiving unit corresponding to the respective transmitting unit;
a signal generation unit generates a third signal based on the first and second signals; and
a control unit controls the first adjustment unit and the switch based on the third signal.

2. The apparatus according to claim 1, wherein the third signal is a signal related to a phase difference between a phase of the first signal and a phase of the second signal.

3. The apparatus according to claim 1, wherein the third signal is a signal related to an amplitude difference between an amplitude of the first signal and an amplitude of the second signal.

4. The apparatus according to claim 1, wherein the number of transmitting units is equal to the number of receiving units.

5. A control method performed by an apparatus, wherein the apparatus comprises:
a plurality of receiving units including at least first and second receiving units;
at least one transmitting unit comprising a third adjustment unit configured to generate a fourth signal by adjusting a phase and an amplitude of a received signal;
a switch disposed between the transmitting unit and the receiving unit, the receiving unit corresponding to the respective transmitting unit;
a signal generation unit; and
a control unit, and
wherein the control method comprises:
generating a first signal by adjusting a phase and an amplitude of a signal received by the first receiving unit;
generating a second signal by adjusting a phase and an amplitude of a signal received by the second receiving unit;
generating a third signal based on the first and second signals; and
controlling, based on the third signal, the switch and the adjusting of the phase and the amplitude of the signal received by the first receiving unit.

6. A non-transitory computer readable medium storing a program for causing a computer of an apparatus to execute a process, wherein the apparatus comprises:
a plurality of receiving units including at least first and second receiving units;
at least one transmitting unit comprising a third adjustment unit configured to generate a fourth signal by adjusting a phase and an amplitude of a received signal;
a switch disposed between the transmitting unit and the receiving unit, the receiving unit corresponding to the respective transmitting unit;
a signal generation unit; and
a control unit, and
wherein the process comprises:
generating a first signal by adjusting a phase and an amplitude of a signal received by the first receiving unit;

generating a second signal by adjusting a phase and an amplitude of a signal received by the second receiving unit;
generating a third signal based on the first and second signals; and
controlling, based on the third signal, the switch and the adjusting of the phase and the amplitude of the signal received by the first receiving unit.

* * * * *